United States Patent
Lee et al.

(10) Patent No.: US 10,544,254 B2
(45) Date of Patent: Jan. 28, 2020

(54) PREPARATION AND APPLICATION OF DICYCLOPENTADIENE-PHENOL AND 2,6-DIMETHYL PHENOL COPOLYMER EPOXY RESIN

(71) Applicant: NAN YA PLASTICS CORPORATION, Taipei (TW)

(72) Inventors: Cheng-Chung Lee, Taipei (TW); Chen-Hua Wu, Taipei (TW); Jaou-Shain Yu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 15/414,582

(22) Filed: Jan. 24, 2017

(65) Prior Publication Data

US 2018/0208710 A1 Jul. 26, 2018

(51) Int. Cl.

| | |
|---|---|
| *C08G 59/06* | (2006.01) |
| *C09D 163/08* | (2006.01) |
| *C09D 5/18* | (2006.01) |
| *C09D 7/20* | (2018.01) |
| *C09D 163/04* | (2006.01) |
| *C08G 59/08* | (2006.01) |

(52) U.S. Cl.
CPC ......... *C08G 59/063* (2013.01); *C08G 59/08* (2013.01); *C09D 5/18* (2013.01); *C09D 7/20* (2018.01); *C09D 163/04* (2013.01); *C09D 163/08* (2013.01)

(58) Field of Classification Search
CPC .................................................. C08G 59/32
See application file for complete search history.

(56) References Cited

U.S. PATENT DOCUMENTS

| | | | |
|---|---|---|---|
| 9,512,257 B2 | 12/2016 | Fung et al. | |
| 2017/0283609 A1* | 10/2017 | Zeng | C08L 63/04 |
| 2018/0318728 A1* | 11/2018 | Steffens | B01D 3/141 |

FOREIGN PATENT DOCUMENTS

| | | | |
|---|---|---|---|
| CN | 101353471 A | | 1/2009 |
| CN | 103724596 A | | 4/2014 |
| CN | 105778413 | * | 7/2016 |
| EP | 0556429 A1 | | 8/1993 |
| JP | 2011-74330 A | | 4/2011 |
| TW | 216439 | | 11/1993 |
| TW | 201038151 | | 10/2010 |

* cited by examiner

*Primary Examiner* — Kuo Liang Peng
(74) *Attorney, Agent, or Firm* — Li & Cai Intellectual Property (USA) Office

(57) ABSTRACT

This invention provides a new dicyclopentadiene phenol and 2,6-dimethyl phenol copolymer epoxy resin with excellent heat resistance, low dielectric constant Dk, low dissipation factor Df having the formula 1. Preparation of dicyclopentadiene phenol and 2,6-dimethyl phenol copolymer epoxy resin in two steps: Step 1, reacting (a1) dicyclopentadiene phenol resin represented by formula 2 with (a2) 2,6-dimethyl phenol in the presence of acid catalyst by (a3) aldehyde compounds to synthesize dicyclopentadiene phenol-2,6-dimethyl phenol copolymer, and Step 2, reacting dicyclopentadiene phenol and 2,6-dimethyl phenol copolymer with excess epichlorhydrin under NaOH condition to prepare dicyclopentadiene phenol and 2,6-dimethyl phenol copolymer epoxy resin. When this dicyclopentadiene phenol and 2,6-dimethyl phenol copolymer epoxy resin according to the present invention is substituted into compositions for laminate, they have low dielectric constant, low dissipation factor, and no delamination after longer than 10 minutes 288° C. soldering test and 2 hours pressure cooking test.

1 Claim, No Drawings

PREPARATION AND APPLICATION OF DICYCLOPENTADIENE-PHENOL AND 2,6-DIMETHYL PHENOL COPOLYMER EPOXY RESIN

TECHNICAL FIELDS

The present invention discloses a dicyclopentadiene phenol and 2,6-dimethyl phenol copolymer epoxy resin and preparation method thereof, When this new dicyclopentadiene phenol and 2,6-dimethyl phenol copolymer epoxy resin according to the present invention is substituted into compositions for laminate, its hardening products has high heat resistance, high glass-transition temperature Tg, low dielectric constant Dk, low dissipation factor Df, and applicable for use as the insulating material of high performance printed circuit boards, semiconductor encapsulation materials, and other high reliability electronic components.

PRIOR ART

Taiwan Patent TW216439 discloses a dicyclopentadiene-phenol epoxy resin, which is a epoxy resin with special skeleton construction, structurally contains cycloaliphatic hexatomic ring and five-membered ring, aromatic benzene ring, dicyclopentadiene, and has high heat resistance and low polarity, and its hardening product hardened by hardening agents has low water-absorbing quality and excellent electrical property (low dielectric constant Dk, low dissipation factor Df), and dicyclopentadiene structure has function to reduce the internal stress of cured product. Therefore, the dicyclopentadiene-phenol epoxy resin is always used in glass fiber laminate and printed circuit board industries. Also, extension reaction is made further for the phenolic hydroxyl group (phenolic OH group) of the dicyclopentadiene phenol resin to synthesize benzoxazine resin, active ester resin, benzene alkenyl resin, etc. having high performance, better electrical property, and lower dielectric constant and dissipation factor for the purpose of meeting the tendency requirements of high frequency and high speed electronic products. However, for a long time, our research on electrical property of dicyclopentadiene-phenol epoxy resin shows it has better effect in reduction of the dielectric constant Dk, and smaller effect in reduction of the dissipation factor Df.

Taiwan Patent TW201038151 provides a bifunctional 2,6-dimethyl phenol formaldehyde resin synthesized by reacting 2,6-dimethyl phenol and aldehydes in the present of acid catalyst. The bifunctional 2,6-dimethyl phenol formaldehyde epoxy resin is synthesized from the bifunctional 2,6-dimethyl phenol formaldehyde resin and epichlorohydrin (ECH) in the present of NaOH. Because it has high symmetrical chemical structure, low molecular dipole moment and other feature, 2,6-dimethyl phenol formaldehyde resin can effectively reduce the dielectric constant (Dk) and the dissipation factor (Df), and 2,6-dimethyl phenol is a raw material for synthesizing a material with low dielectric constant (Dk) and low dissipation factor (Df)—polyphenyl ether resin (PPE). The PPE materials feature very low dissipation factor (Df), and the lower the dissipation factor, and the small signal transmission loss. Although the bifunctional 2,6-dimethyl phenol formaldehyde epoxy resin according to patent TW201038151 can effectively reduce the dielectric constant and the dissipation factor (Df), the structural hardening product of the bifunctional 2,6-dimethyl phenol formaldehyde epoxy resin has lower crosslink density, lower glass-transition temperature Tg and poor heat resistance.

To meet the high speed transmission of electronic communication products, for electronic equipment, high speed and high frequency signal transmission is necessary and continuous development tendency. Additionally, as the electronic components trends to be light, thin, short and small, research and development of a resin with low dielectric constant (Dk), low dissipation factor (Df), high heat resistance and high glass-transition temperature Tg is a task expected in the printed circuit board industry.

SUMMARY OF THE INVENTION

Therefore, to complete the above task, the present invention provide a dicyclopentadiene phenol resin and 2,6-dimethyl phenol copolymer epoxy resin, and this copolymer epoxy resin not only has the excellent electrical property of two resins (low dielectric constant Dk and low dissipation factor Df) but also higher heat resistance than the above two resins. As it has the excellent electrical property of the dicyclopentadiene phenol epoxy resin and the 2,6-dimethyl phenol formaldehyde epoxy resin, particularly the low dissipation factor Df of the 2,6-dimethyl phenol formaldehyde epoxy resin, the dicyclopentadiene phenol resin and 2,6-dimethyl phenol copolymer epoxy resin according to the present invention has better electrical property than the dicyclopentadiene-phenol epoxy resin. Also, the copolymer is bonded with the dicyclopentadiene phenol resin and the 2,6-dimethyl phenol formaldehyde resin by addition reaction and is reacted with the epichlorohydrin to prepare the dicyclopentadiene phenol resin and 2,6-dimethyl phenol formaldehyde resin copolymer epoxy resin, compared with the dicyclopentadiene-phenol epoxy resin and the 2,6-dimethyl phenol formaldehyde epoxy resin, the copolymer epoxy resin according to the present invention has reactive epoxy groups with higher functional cardinal number, higher hardening and crosslink density, higher heat resistance, and better mechanical properties. When this new epoxy resin according to the present invention is substituted into compositions for laminate, their hardening product has low dielectric constant (Dk), low dissipation factor (Df), good mechanical properties and high glass-transition temperature Tg, and the high heat resistance of hardenability resign hardening product, and is suitable for copper clad ubstrate, printed circuit boards, semiconductor encapsulation materials to meet the demand for high speed transmission of electronic communication products, and the high speed and high frequency signal transmission of electronic equipment.

The preparation method for the dicyclopentadiene phenol resin and 2,6-dimethyl phenol copolymer epoxy resin according to the present invention comprises the following steps: condensation reaction of the dicyclopentadiene phenol resin with low dielectric constant (Dk) and low dissipation factor (Df) and 2,6-dimethyl phenol to synthesize the dicyclopentadiene phenol resin and 2,6-dimethyl phenol copolymer phenolic resin with more functional cardinal number (6-12), reacting the dicyclopentadiene phenol resin and 2,6-dimethyl phenol copolymer phenolic resin with excess epichlorhydrin under NaOH condition to prepare dicyclopentadiene phenol and 2,6-dimethyl phenol copolymer epoxy resin. The epoxy resin hardening product prepared by the dicyclopentadiene phenol resin and 2,6-dimethyl phenol copolymer epoxy resin and common epoxy resin hardening agent such as dicyandiamide Dicy, phenolic resin PN hardening agent, styrene maleic anhydride copolymer SMA, benzoxazine resin (Benzoxazine), polyphenyl ether resin (PPE) and active ester resin (active ester) has low dielectric constant (Dk), low dissipation factor (Df), good heat resistance and high Tg.

The present invention provides a new dicyclopentadiene phenol resin and 2,6-dimethyl phenol copolymer epoxy resin with molecular structure show in formula 1 compounds to synthesize the dicyclopentadiene phenol resin and the 2,6-dimethyl phenol copolymer phenolic resin,

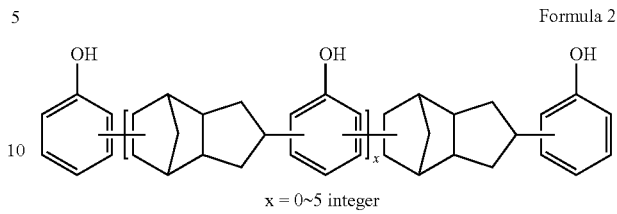

Formula 2 x = 0~5 integer

Reacting 1 mole phenolic hydroxy (phenolic group OH) of (a1) dicyclopentadiene phenol resin, (a2) 2,6-dimethyl phenol 1-2.5 mole and (a3) aldehyde compounds 0.8-1.5 mole. Step 2, reacting the dicyclopentadiene phenol and 2,6-dimethyl phenol copolymer with excess epichlorhydrin under NaOH condition to prepare the dicyclopentadiene phenol and 2,6-dimethyl phenol copolymer epoxy resin. The equivalence ratio of the dicyclopentadiene-phenol and 2,6-dimethyl phenol copolymer to epichlorohydrin (ECH) is 1:1-8, and the equivalence ratio of dicyclopentadiene-phenol and 2,6-dimethyl phenol copolymer to NaOH is 1:0.95-1.1.

The dicyclopentadiene phenol resin and 2,6-dimethyl phenol copolymer epoxy resin according to the present invention is characterized by reaction bonding and epoxidation of two resins with excellent electrical property (low dielectric constant Dk and low dissipation factor Df) such as the dicyclopentadiene phenol resin and the 2,6-dimethyl

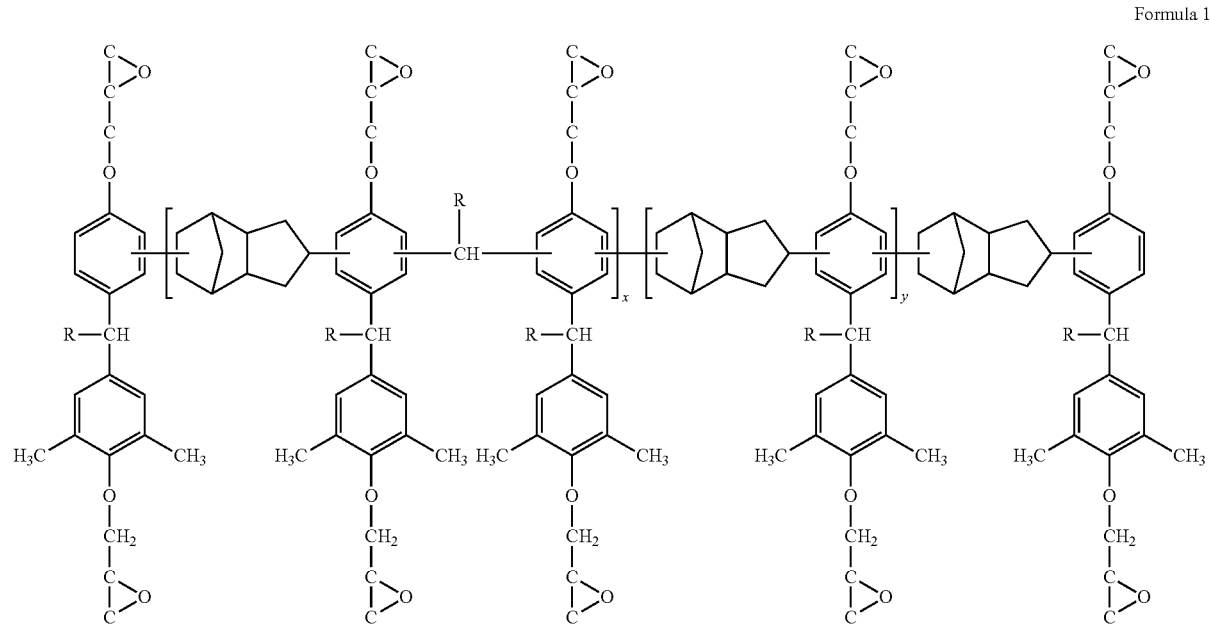

Formula 1 wherein
X is equal to 1-5 integers, and Y is equal to 1-5 integers.
R represent as hydrogen, $C_1$-$C_{10}$ alkyl group, phenyl group, phenyl hydroxyl group . . . etc.

This new dicyclopentadiene phenol and 2,6-dimethyl phenol copolymer epoxy resin is prepared in two steps: Step 1, reacting (a1) dicyclopentadiene phenol resin represented by following structural formula 2 with (a2) 2,6-dimethyl phenol in the presence of acid catalyst by (a3) aldehyde phenol resin, and so has the characteristic of the dicyclopentadiene phenol epoxy resin, such as low dielectric constant Dk, and low water absorption, and the characteristic of the 2,6-dimethyl phenol epoxy resin such as low dielectric constant Dk and low dissipation factor Df. Therefore, this new dicyclopentadiene phenol resin and 2,6-dimethyl phenol copolymer epoxy resin has better electrical property (low dielectric constant Dk and low dissipation factor Df) than the dicyclopentadiene phenol epoxy resin. The preparation method includes the following steps: condensation and dehydration reaction of the dicyclopentadiene phenol resin and the 2,6-dimethyl phenol with the aldehyde compounds in the present of the acid catalyst to bond two resins, that is to say, bonding a plurality of reaction points in the dicyclopentadiene phenol resin with the 2,6-dimethyl phenol by using the aldehyde compounds as a cross-linking agent to prepare a copolymer (see the following equation):

phenolic hydroxyl group is analyzed by a gel permeation chromatography (GPC). According to theoretical formula, functional cardinal number=Mn÷equivalent weight of phenolic hydroxyl group, the theoretical average functional cardinal number is 6-10. The epoxidation is performed for the dicyclopentadiene phenol resin and the phenolic hydroxyl group of the 2,6-dimethyl phenol copolymer to synthesize the dicyclopentadiene phenol resin and 2,6-dim-

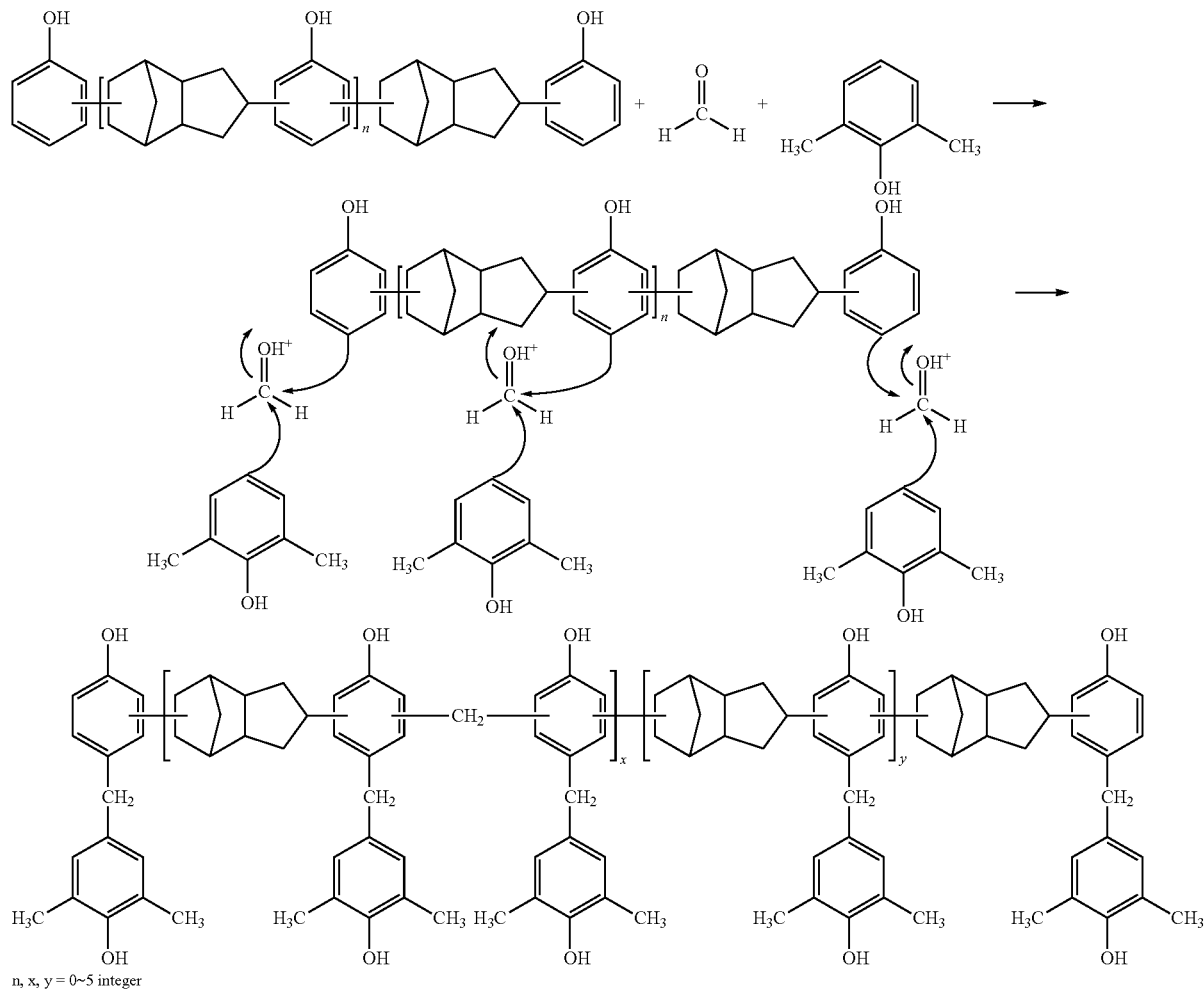

n, x, y = 0~5 integer

The functional cardinal number f of phenolic hydroxyl group (phenolic group OH) on the copolymer structure is equal to the number of phenolic hydroxyl group (n+2) of the dicyclopentadiene phenol resin plus the number of 2, 6 dimethyl phenol bonded with the dicyclopentadiene phenol resin x+y+2, and so x+y=n, i.e. f=2n+4. Compared with the dicyclopentadiene phenol resin or the 2,6-dimethyl phenol formaldehyde resin, the copolymer contains the more functional cardinal number of the phenolic hydroxyl group. The functional cardinal number of the phenolic hydroxyl group is directly proportional to the equivalent weight of the aldehyde compounds. The larger the equivalent weight of the aldehyde compounds, the more cross linking agent bonded, and the more the functional cardinal number of the phenolic hydroxyl group in the dicyclopentadiene phenol resin and the 2,6-dimethyl phenol copolymer. The average molecular weight Mn and the equivalent weight 150 g/eq of ethyl phenol copolymer epoxy resin having more functional groups, better heat resistance after hardening and high glass-transition temperature Tg, thereby obtaining expected the dicyclopentadiene phenol resin and 2,6-dimethyl phenol copolymer epoxy resin having low Dk and Df, good heat resistance, and high Tg.

The present invention further provides a preparation method for dicyclopentadiene phenol resin and 2,6-dimethyl phenol copolymer epoxy resin, comprising two steps: Step 1, adding (a1) 1 mole phenolic hydroxyl group (phenolic group OH) of dicyclopentadiene phenol resin, and (a2) 2, 6-dimethyl phenol 1-2.5 mole into the acid catalyst, and dissolve 0.8-1.5 mole aldehyde compound in water, and dropwise add the solution into the above reaction mixture, and react with the aqueous solution of aldehyde compound at 95-115° C. for 1-6 h. The common acid catalyst includes methanesulfonic acid (MSA), p-toluenesulfonic acid (PTSA), oxalic acid and hydrochloric acid, and the content of the acid catalyst is 0.5-5% of the content of the dicyclopentadiene phenol resin. The aldehyde compounds include formaldehyde, acetaldehyde, glyoxal, benzaldehyde and the like. After reaction and neutralization, remove 2,6-dimethyl phenol, wash and remove the solvent to obtain the dicyclopentadiene phenol resin and 2,6-dimethyl phenol copolymer phenolic resin. Step 2: react the dicyclopentadiene phenol resin and 2,6 dimethyl phenol copolymer phenolic resin prepared in Step 1 with excess epichlorohydrin in the present of NaOH under common epoxidation condition to prepare the dicyclopentadiene phenol and 2,6-dimethyl phenol copolymer epoxy resin. The equivalence ratio of the dicyclopentadiene-phenol and 2,6-dimethyl phenol copolymer to epichlorohydrin (ECH) is 1:1-8, and the equivalence ratio of dicyclopentadiene-phenol and 2,6-dimethyl phenol copolymer to NaOH is 1:0.95-1.1. The temperature of epoxidation pre-reaction and main reaction is 50-100° C. Obtain the dicyclopentadiene phenol resin and 2,6-dimethyl phenol copolymer epoxy resin according to the present invention after removing the epichlorohydrin, refining reaction, desalination, neutralization, washing, solution filtration, and removing the solvent.

The present invention further discloses a epoxy resin varnish for glass fiber substrate, comprising (1) the dicyclopentadiene phenol resin and 2,6-dimethyl phenol copolymer epoxy resin according to the present invention, the content of which is 30-80% of the resin (the total content of the resin is equal to the sum of the contents of the components 1-4); (2) a multifunctional or bifunctional, or modified epoxy resin, the content of which is 0-25% of the resin, selected from o-cresol phenolic aldehyde epoxy resin, phenolic aldehyde epoxy resin, benzaldehyde-phenol multifunctional epoxy resin, dicyclopentadiene-phenol epoxy resin, bisphenol A formaldehyde epoxy resin, tetraphenol ethane phenolic aldehyde epoxy resin, tri-(hydroxy phenyl) methane phenolic aldehyde epoxy resin, phosphorus containing epoxy resin, 2,6-dimethyl phenol phenolic aldehyde epoxy resin, brominated epoxy resin, tetrabromobisphenol A epoxy resin, bisphenol A epoxy resin, and epoxide and isocyanate copolymer; (3) a hardening agent, the content of which is 15-60% of the resin, selected from phenolic resin, bisphenol A phenolic resin, dicyclopentadiene phenol resin, benzaldehyde-phenol phenolic resin, melamine-phenol phenolic resin (melamine-phenol novolac), active ester hardening agent, styrene maleic anhydride copolymer (SMA), bisphenol A benzoxazine (BPA Benzoxazine), bisphenol F benzoxazine (BPF Benzoxazine), dicyclopentadiene-phenolbenzoxazine (Dicyclopentadiene-phenol Benzoxazine), polyphenyl ether (PPE), and more than two (or two) of the above hardening agents; (4) a fire retardant, the content of which is 10-40% of the resin, including a reactive fire retardant and a additive fire retardant, selected from phosphorus containing bisphenol A phenolic aldehyde hardening agent (phosphorus content 5-10%), hexaphenoxy cyclotriphosphazene (phosphorus content 13.4%, nitrogen content 8%) and tetrabromobisphenol A (bromine content 58.5%); (5) a filler, the content of which is 0-45% of the all varnish components (calculated in the solid state, the total component content of the varnish is equal to the sum of the content of the components 1-5), selected from silicon dioxide and aluminium hydroxide; (6) a solidification accelerant, the content of which is 0.01-0.2% of epoxy resin+hardening agent (i.e. the sum of the content of components 1-3), selected from dimethyl imidazole, diphenyl imidazole, diethyl tetramethyl imidazole and benzyl dimethylamine; and (7) a solvent, the content of which is 50-70% of all solid varnish components, selected from acetone, butanone, cyclohexanone, dimethoxy ethanol (MCS), propylene glycol monomethyl ether (PM), and methylbenzene.

The hardening product obtained by the dicyclopentadiene phenol resin and 2,6-dimethyl phenol copolymer epoxy resin according to the present invention and its varnish after thermal hardening may be used in different applications, including, for example, insulating material for PCB, EMC semiconductor encapsulation and high reliability motor/electronic component, and coating and adhesive requiring excellent electrical property and heat resistance.

Advantages of invention: the present invention provides the preparation method and application of a dicyclopentadiene phenol resin and 2,6-dimethyl phenol copolymer epoxy resin, and the hardening product prepared by its varnish after thermal hardening has excellent heat resistance, low dielectric constant, low dissipation factor (Df), high Tg, and the like, and conforms to the high speed and high frequency development tendency of electronic industry.

DETAILED DESCRIPTION OF THE PREFERRED EMBODIMENT

The detailed description is provided below to more clearly understand the present invention.

The dicyclopentadiene phenol resin and 2,6-dimethyl phenol copolymer epoxy resin according to the present invention has the most obvious advantage that two resins with the excellent electrical property, such as the dicyclopentadiene phenol epoxy resin and the 2,6-dimethyl phenol formaldehyde epoxy resin, are bonded by grafting reaction, and therefore, the copolymer epoxy resin according to the present invention has better electrical property (low dielectric constant Dk and low dissipation factor Df), heat resistance and Tg property than the above two resins. The dicyclopentadiene phenol resin and the 2,6-dimethyl phenol formaldehyde resin are bonded with aldehyde compounds by the grafting reaction in the present of the acid catalyst, and then epoxidation reaction is performed with the epichlorohydrin to prepare the epoxy resin. Due to the bonding by the grafting reaction, the epoxy resin according to the present invention has more functional cardinal number of epoxy group, higher crosslink density after hardening, and so has better electrical property (low dielectric constant Dk and low dissipation factor Df), heat resistance and Tg property than the above two resins.

Explicitly, the preparation method for the dicyclopentadiene phenol resin and 2,6-dimethyl phenol copolymer epoxy resin according to the present invention comprises two steps: Step 1 (synthesis of dicyclopentadiene phenol resin and 2,6-dimethyl phenol copolymer phenolic resin): add 1 mole phenolic hydroxyl group (phenolic group OH) of (a1) dicyclopentadiene phenol resin and (a2) 2,6-dimethyl phenol 1~2.5 mole into the solvent with intermediate boiling point and low water solubility (boiling point >110° C.), add the acid catalyst, heat to 95-115° C., dissolve 0.8-1.5 mole aldehyde compound in water to prepare 20-50% aqueous solution of aldehyde compound (if the aldehyde compound is liquid, do not prepare the aqueous solution), dropwise add the aqueous solution into the above reaction mixture, react with the aqueous solution of aldehyde compound at 95-115° C. for 1-6 h. The common acid catalyst comprises methanesulfonic acid (MSA), p-toluenesulfonic acid (PTSA), oxalic acid, hydrochloric acid and the like. The use level of the acid catalyst is 0.5-5% of the use level of the dicyclopentadiene phenol resin, and the aldehyde compound comprises formaldehyde, acetaldehyde, glyoxal, benzaldehyde and the like. In the reaction process, the removal of the water may result in the full reaction of the aldehyde compound, and addition of the solvent is to remove the water by co-boiling with the water and remove the aqueous phase by phase separation. The solvent is selected form methyl isobutyl ketone (MIBK), methylbenzene and other solvent with intermediate boiling point and low water solubility. The use level of the solvent is 5-20% of the use level of the dicyclopentadiene phenol resin. After dropwise addition and reaction, perform ripening reaction for 30 min-2 h. After the reaction, neutralize the acid catalyst with alkali. The alkali is not limited, including common industrial alkali, such as sodium hydroxide, potassium hydroxide, amine and the like. After neutralization to pH 6-7, heat to 175-185° C. to remove the solvent and 2,6-dimethyl phenol. After 175-185° C. is reached, slowly reduce vacuum degree to prevent suddenly boiling till vacuum degree <5 torr. Under the condition of vacuum degree <5 torr, maintain 175-185° C. for 1 h. continuously add the solvent such as the methyl isobutyl ketone (MIBK), the methylbenzene and so on, add water for desalination and washing, and obtain the dicyclopentadiene phenol resin and the 2,6-dimethyl phenol copolymer phenolic resin after filtration, removal of the solvent, Step 2 (synthesis of icyclopentadiene phenol and 2,6-dimethyl phenol copolymer epoxy resin): reacting the dicyclopentadiene-phenol and 2, 6 dimethyl phenol copolymer prepared in Step 1 with excess epichlorohydrin in the present of sodium hydroxide (NaOH) to prepare dicyclopentadiene phenol and 2, 6 dimethyl phenol copolymer epoxy resin, as shown in Steps (1)-(5). (1) pre-reaction: add the dicyclopentadiene phenol resin and 2,6-dimethyl phenol copolymer phenolic resin and the epichlorohydrin (ECH), the equivalence ratio of which is 1:1-8, into a cosolvent, the use level of which is 10-40% of the dicyclopentadiene phenol resin and the 2,6-dimethyl phenol copolymer phenolic resin. The cosolvent comprises propylene glycol monomethyl ether (PM) or alcohol. Add 49.5% NaOH. The equivalence ratio of the dicyclopentadiene phenol resin and 2,6-dimethyl phenol copolymer phenolic resin to NaOH is 1:0.1-0.2; pre-reaction temperature is 50-100° C. and pre-reaction time is 2-4 h. (2) Main reaction: dropwise add the 49.5% NaOH into the reaction mixture at 0.77-0.97:1 equivalence ratio of NaOH to the dicyclopentadiene phenol resin and 2,6-dimethyl phenol copolymer phenolic resin; reaction temperature is 60-65° C., vacuum degree is 160-190 torr and dropwise addition time is 2-5 h, and during the main reaction, remove the water from the reaction system by co-boiling of water and ECH, and return the ECH on the low layer to the system by phase separation in the phase separating barrel, and discharge the water layer. (3) Removal of epichlorohydrin: remove the excess epichlorohydrin ECH at 160° C. temperature and vacuum degree <5 torr. (4) Refining reaction: add the solvent to prepare 30-50% solid content of resin solution, add 20% NaOH for refining reaction; the use level of NaOH=measured value of hydrolyzable chlorine÷35.5×40×refining coefficient 1.5×weight of resin÷0.2; refining reaction temperature is 70-90° C., and refining reaction time is 1-3 h. (5) After the reaction, add the water for desalination and liquid separation, and filter the resin solvent after neutralizing and washing the separated liquid, and obtain the dicyclopentadiene phenol and 2,6-dimethyl phenol copolymer epoxy resin according to the present invention after removal of the solvent.

More detailed description of the preparation method for dicyclopentadiene phenol and 2,6-dimethyl phenol copolymer epoxy resin according to the present invention, for example, comprising the above Steps 1 and 2. Step 1: add 1 mole phenolic hydroxyl group (phenolic group OH) of (a1) dicyclopentadiene phenol resin and (a2) 2,6-dimethyl phenol 1-2.5 mole into the solvent with intermediate boiling point and low water solubility (boiling point >110° C.), add the acid catalyst, heat to 95-115° C., dissolve 0.8-1.5 mole aldehyde compound in water to prepare 20-50% aqueous solution of aldehyde compound (if the aldehyde compound is liquid, do not prepare the aqueous solution), dropwise add the aqueous solution into the above reaction mixture. To achieve the high percent conversion and high reaction rate in the reaction process, remove water by separating the water using the solvent with intermediate boiling point and low water solubility and phase in the phase separating barrel and discharging the water layer, and return the ECH on the low layer to the system. Dropwise add the aqueous solution of aldehyde compound to achieve better reaction efficiency and more complete reaction. The reaction in this step may cause two results: first, the dicyclopentadiene phenol resin is bonded through reacting the aldehyde with its dicyclopentadiene-phenol or the aldehyde with the 2,6-dimethyl phenol with; second, the 2,6-dimethyl phenol is bonded through reacting the aldehyde with its 2,6-dimethyl phenol. The weight average molecular weight of the prepared product has positive correlation with the use level of the aldehyde compound. The use level of the aldehyde compound is the total equivalent weight of the dicyclopentadiene phenol resin and the 2, 6 dimethyl phenol, and the equivalent weight of the added aldehyde compound is preferably 0.8-1.2.

Step 2: synthesis of the dicyclopentadiene-phenol and 2,6-dimethyl phenol copolymer phenolic resin obtained in Step 1 into the dicyclopentadiene phenol and 2,6-dimethyl phenol copolymer epoxy resin under common epoxidation condition, i.e. epoxidation reaction with the excess epichlorohydrin in the present of sodium hydroxide to prepare the dicyclopentadiene-phenol and 2,6-dimethyl phenol copolymer phenolic resin.

The preferred embodiment of the present invention is detailed by the following embodiments.

Embodiment A: (Synthesis of dicyclopentadiene phenol and 2,6-dimethyl phenol copolymer epoxy Resin A)

Mix and heat dicyclopentadiene phenol resin (Nan Ya Plastics Corporation, NPEH-772L, softening point 85° C.) 170 g (1 mole phenolic hydroxyl group), 2,6-dimethyl phenol 170 g, solvent methyl isobutyl ketone (MIBK) 30 g, catalyst methanesulfonic acid MSA 1.7 g to 107° C., react for 3.5 h after dropwise adding 23% formaldehyde solution 130 g at 107° C., and perform the ripening reaction for 1 h at 107° C. After the reaction, add 0.8 g 49.5% aqueous solution NaOH to neutralize till pH=6-7, heat to 140° C. for dehydration, and continuously heat to 185° C. and slowly reduce the vacuum degree to 5 torr. After the temperature and the vacuum degree reaches set value 185° C. and 5 torr, maintain the temperature and the vacuum degree for 1 h. Add the solvent methyl isobutyl ketone 550 g after cooling and vacuum breakage, stir for 60 min at 80° C., add water 50 g, stand for layering at 80° C., remove the saline layer at lower layer; add water 50 g for washing, stand for layering at 80° C., remove the water layer at lower layer, and repeatedly wash for 1 time. After filtration of the solution, dehydrate at 120° C., heat to 180° C., reduce the vacuum degree to less than 5 torr, and remove the solvent methyl isobutyl ketone (MIBK) to obtain dicyclopentadiene-phenol and 2,6-dimethyl phenol copolymer phenolic resin A with 99.5% yield and quality situation: average molecular weight Mw2500, softening point 126° C., equivalent weight of phenolic hydroxyl group 150 g/eq.

Mix and heat dicyclopentadiene-phenol and 2,6-dimethyl phenol copolymer resin phenolic resin A 150 g, epichlorohydrin 555 g, and propylene glycol monomethyl ether PM 166 g to 60° C., add 49.5% NaOH 12.1 g for 3 h pre-reaction; dropwise add 49.5% NaOH 66 g into the mixed solution for main reaction at temperature 62° C. and vacuum degree 180 torr for 4 h, end the main reaction at 150° C. and 10 torr, dehydrate and remove the ECH after maintaining the above condition for 1 h, add and dissolve the solvent methyl isobutyl ketone 207 g at 80° C. for 30 min, add purified water 196 g, stand 15 min for layering after stirring at 80° C., and remove the water layer at lower layer. According to analysis the hydrolyzable chlorine of the resin is 2500 ppm. Perform refining reaction at 80° C., add 49.5% sodium hydroxide 1.75 g and purified water 2 g to react for 2 h. Continuously add the solvent MIBK 276 g and purified water 50 g, stand for 15 min for phase separation after stirring at 80° C., remove the water layer at lower layer; add purified water 30 g and 10% $NaH_2PO_4$ 20 g, stand for 15 min for phase separation, remove the water layer at lower layer when the pH is 6-7; add purified water 40 g stand for 15 min for phase separation, remove the water layer at lower layer; heat to 117° C. for circulation dehydration for 1 h, heat to 150° C. after filtration of the solution, gradually reduce the vacuum degree to 5 torr, and maintain 150° C. and 5 torr for 1 h to obtain the dicyclopentadiene phenol and 2,6-dimethyl phenol copolymer epoxy resin A according to the present invention.

Quality situation: epoxide equivalent 228 g/eq, hydrolyzable chlorine 240 ppm, weight average molecular weight Mw3500.

Embodiment B: (Synthesis of dicyclopentadiene phenol and 2,6-dimethyl phenol copolymer epoxy Resin B)

Mix and heat dicyclopentadiene phenol resin (Nan Ya Plastics Corporation, NPEH-772L, softening point 110° C.) 180 g (1 mole phenolic hydroxyl group), 2,6-dimethyl phenol 170 g, solvent methyl isobutyl ketone (MIBK) 30 g, catalyst methanesulfonic acid MSA 1.7 g to 107° C., react for 3.5 h after dropwise adding 23% formaldehyde solution 130 g at 107° C., and perform the ripening reaction for 1 h at 107° C. After the reaction, add 0.8 g 49.5% aqueous solution NaOH to neutralize till pH=6-7, heat to 140° C. for dehydration, and continuously heat to 185° C. and slowly reduce the vacuum degree to 5 torr. After the temperature and the vacuum degree reaches set value 185° C. and 5 torr, maintain the temperature and the vacuum degree for 1 h. Add the solvent methyl isobutyl ketone 550 g after cooling and vacuum breakage, stir for 60 min at 80° C., add water 50 g, stand for layering at 80° C., remove the saline layer at lower layer, add water 50 g for washing, stand for layering at 80° C., remove the water layer at lower layer, and repeatedly wash for 1 time. After filtration of the solution, dehydrate at 120° C., heat to 180° C., reduce the vacuum degree to less than 5 torr, and remove the solvent methyl isobutyl ketone (MIBK) to obtain dicyclopentadiene-phenol and 2,6-dimethyl phenol copolymer phenolic resin B with 99.5% yield and quality situation: average molecular weight Mw2800, softening point 129° C., equivalent weight of phenolic hydroxyl group 154 g/eq.

Mix and heat dicyclopentadiene-phenol and 2,6-dimethyl phenol copolymer resin phenolic resin B 154 g, epichlorohydrin 555 g, and propylene glycol monomethyl ether PM 166 g to 60° C., add 49.5% NaOH 12.1 g for 3 h pre-reaction for; dropwise add 49.5% NaOH 66 g into the mixed solution for main reaction at temperature 62° C. and vacuum degree 180 torr for 4 h, and end the main reaction at 150° C. and 10 torr, dehydrate and remove the ECH after maintaining the above condition for 1 h, add and dissolve the solvent methyl isobutyl ketone 207 g at 80° C. for 30 min, add purified water 196 g, stand 15 min for layering after stirring at 80° C., and remove the water layer at lower layer. According to analysis the hydrolyzable chlorine of the resin is 2200 ppm. Perform the refining reaction at 80° C., add 49.5% sodium hydroxide 1.70 g and purified water 2 g to react for 2 h. Continuously add the solvent MIBK 276 g and purified water 50 g, stand for 15 min for phase separation after stirring at 80° C., remove the water layer at lower layer; add purified water 30 g and 10% $NaH_2PO_4$ 20 g, stand for 15 min for phase separation, remove the water layer at lower layer when the pH is 6-7; add purified water 40 g stand for 15 min for phase separation, remove the water layer at lower layer; heat to 117° C. for circulation dehydration for 1 h, heat to 150° C. after filtration of the solution, gradually reduce the vacuum degree to 5 torr, and maintain 150° C. and 5 torr for 1 h to obtain the dicyclopentadiene phenol and 2,6-dimethyl phenol copolymer epoxy resin B according to the present invention.

Quality situation: epoxide equivalent 232 g/eq, hydrolyzable chlorine 210 ppm, weight average molecular weight Mw3800.

See Table 1 for the physical properties of the copper-clad plate prepared in Embodiments 1-5

In Embodiments 1-5, the dicyclopentadiene phenol and 2,6-dimethyl phenol copolymer epoxy resin according to the present invention is used as the component of the resin varnish with good heat resistance and low dielectric constant to prepare the glass fiber substrate. See Table 1 for the compositions of the resin varnish. For example, preparation of the glass fiber substrate by 65% resin varnish with solid content adjusted by the solvent, such as propylene glycol monomethyl ether (PM), or butanone, or acetone, in known method: dip 7628 glass fibre cloth in the above resin solution, dry for several minutes at 170° C. (including temperature dipping machine), adjust the melt viscosity of the dried dipping sheet by controlling the drying time, the minimum of which is 4000-10000 poise, finally overlap 8 dipping sheets between two 35-um copper clad layer by layer, and at 25 kg/$cm^2$ pressure and temperature rise control order:

85° C.→85° C.→200° C.→200° C.→130° C.

20 min 30 min 120 min slowly cooling

To obtain 1.6 mm copper clad laminates after hot-pressing.

TABLE 1

Composition of varnish used and physical property of glass fiber substrate prepared in embodiment

| Item | Embodiment 1 | Embodiment 2 | Embodiment 3 | Embodiment 4 | Embodiment 5 |
|---|---|---|---|---|---|
| Dicyclopentadiene phenol and 2,6-dimethyl phenol | 100 | — | 80 | 85 | 75 |

TABLE 1-continued

Composition of varnish used and physical property of glass fiber substrate prepared in embodiment

| Item | Embodiment 1 | Embodiment 2 | Embodiment 3 | Embodiment 4 | Embodiment 5 |
|---|---|---|---|---|---|
| copolymer epoxy resin Embodiment A | | | | | |
| Dicyclopentadiene phenol and 2,6-dimethyl phenol copolymer epoxy resin Embodiment B | — | 100 | — | — | — |
| Benzaldehyde-phenol multifunctional group epoxy resin Nan Ya Plastics Corporation NPPN-433 EEW240 g/eq | — | — | — | — | 25 |
| Phenolic resin Nan Ya Plastics Corporation NPEH-710H OH 105 g/eq | 10 | 10 | — | — | 10 |
| Melamine-phenol novolac SD-1817 OH 80 g/eq | 5 | 5 | 6.3 | 5 | 5 |
| Phosphorus hardening agent Shina LC950 OH 340 g/eq | 21 | 21 | 21 | 21 | 21 |
| Active ester hardening agent DICHPC8000 OH 223 g/eq | 30 | 30 | — | 50 | 30 |
| Additive-type phosphorus fire retardant Dazhong SPB-100 | 16 | 16 | 20 | 18 | 16 |
| Styrene-maleic anhydride copolymer SMA | — | — | 50 | — | — |
| Bisphenol F BX, benzoxazine Nan Ya Plastics Corporation NPEX-235 | — | — | 40 | — | — |
| Polyphenyl ether PPE sabic MX-9000 | — | — | — | 15 | — |
| Filler SiO2 | 98 | 98 | 106 | 104 | 98 |
| Accelerant 2MI/DMF | 0.03 | 0.03 | 0.02 | 0.025 | 0.03 |
| Solvent PM or MEK | 150 | 150 | 163 | 160 | 150 |
| Tg ° C. | 176 | 181 | 180 | 178 | 173 |
| Dk (3G) | 4.20 | 4.20 | 4.21 | 4.15 | 4.23 |
| Df (3G) | 0.006 | 0.0065 | 0.0068 | 0.0055 | 0.007 |
| T-288 (copper-bearing) heat resistance (minute) | >60 | >60 | >60 | >60 | >60 |
| T288 solder heat resistance (minute) | >10 | >10 | >10 | >10 | >10 |

COMPARABLE EXAMPLES 1-3

Without use of the dicyclopentadiene phenol and 2,6-dimethyl phenol copolymer epoxy resin according to the present invention, the other epoxy resin with low dielectric constant is used as the comparable examples, the composition of which is given in Table 2. The benzaldehyde-phenol epoxy resin (Nan Ya Plastics Corporation NPPN-433) is used in the comparable example 1, the 2,6-dimethyl phenol phenolic aldehyde epoxy resin (Nan Ya Plastics Corporation NPPN-260) is used in the comparable example 2, and the dicyclopentadiene-phenol epoxy resin (Nan Ya Plastics Corporation NPPN-272H) is used in the comparable example 3.

TABLE 2

Composition of varnish used and physical property of glass fiber substrate prepared in comparable example

| Item | Comparable example 1 | Comparable example 2 | Comparable example 3 |
|---|---|---|---|
| Dicyclopentadiene-phenol epoxy resin Nan Ya Plastics Corporation NPPN-272H EEW270 g/eq | — | — | 100 |
| 2,6-dimethyl phenol formaldehyde epoxy resin Nan Ya Plastics Corporation NPPN-260 EEW198 g/eq | — | 100 | — |
| Benzaldehyde-phenol functional group epoxy resin Nan Ya Plastics Corporation NPPN-433 EEW240 g/eq | 100 | — | — |
| Melamine-phenol novolacSD-1817OH 80 g/eq | 5.5 | 6 | 6.5 |
| Phenolic resin Nan Ya Plastics Corporation NPEH-710H OH 105 g/eq | 10 | 10 | 10 |
| Phosphorus hardening agent ShinaLC950 OH 340 g/eq | 20 | 22 | 22 |
| Active ester hardening agent DICHPC8000 OH 223 g/eq | 30 | 30 | 30 |

TABLE 2-continued

Composition of varnish used and physical property of glass fiber substrate prepared in comparable example

| Item | Comparable example 1 | Comparable example 2 | Comparable example 3 |
|---|---|---|---|
| Additive-type phosphorus fire retardant Dazhong SPB-100 | 16 | 18 | 20 |
| filler SiO2 | 98 | 98 | 98 |
| Accelerant 2MI/DMF | 0.05 | 0.04 | 0.04 |
| Solvent PM or MEK | 150 | 150 | 150 |
| Tg ° C. | 170 | 153 | 162 |
| Dk (3G) | 4.48 | 4.29 | 4.30 |
| Df (3G) | 0.0083 | 0.0068 | 0.0072 |
| T-288 (copper-bearing) heat resistance (minute) | >60 | 27 | 32 |
| T288 solder heat resistance (minute) | >10 | >10 | >10 |

According to the above testing results, the glass fiber substrate prepared by substituting the dicyclopentadiene phenol and 2,6-dimethyl phenol copolymer epoxy resin according to the present invention into the formula has lower dielectric constant Dk and dissipation factor Df that those prepared from the benzaldehyde-phenol epoxy resin in the comparable example 1, the 2,6-dimethyl phenol in the comparable example 2 and the dicyclopentadiene-phenol epoxy resin in the comparable example 3, and after substituting the dicyclopentadiene phenol and 2, 6 dimethyl phenol copolymer epoxy resin according to the present invention into the formula, Tg is higher than that of those prepared in the comparable examples 1-3.

1. Water Absorption Test (PCT for 2 h)

Testing method: cut the etched substrate into 5 cm² square test sheets, after baking for 2 hr at 105° C. in a oven, place the test sheet in a pressure cooker at 2atm×120° C. for 120 min, and record the weight difference of the test sheet before and after the PCT, which is divided by the initial weight of the test sheet to obtain the water absorption.

2. 288☐ Solider Heat Resistance ((PCT for 2 h)

Testing method: dipping the test sheet passing PCT in 288° C. in a soldering furnace, and record the delamination time.

3. T-288 Heat Resistance (Copper-Bearing)

Analyzed by a thermal mechanical analyzer. Testing method: cut copper clad laminates into 6.35 mm² square test sheets and place the test sheet on the test deck of the thermal mechanical analyzer after baking in the oven at 105° C. for 2 h, heat at 10° C./min till 288° C. after zeroing, maintain 288° C., and record the delamination time of the copper clad laminates.

4. Dielectric Constant Test:

Testing method: cut the substrate without the copper clad into 5cm×5cm square test sheets, and after baking in the oven at 105° C. for 2 h, measure the thickness by a thickness gauge, and place the test sheet in the impedance analyzer (Agilent E4991A) to obtain the average dielectric constant Dk of 3 points 5. Dissipation Factor Test:

Testing method: cut the substrate without the copper clad into 5cm×5cm square test sheets, and after baking in the oven at 105° C. for 2 h, measure the thickness by a thickness gauge, and place the test sheet in the impedance analyzer (Agilent E4991A) to obtain the average dissipation factor Dk of 3 points 6. Glass-Transition Temperature Test:

Analyzed by a differential scanning calorimeter (DSC), and temperature rise rate 20° C./min.

7. Molecular Weight Mw:

Analyzed by gel chromatography GPC and corrected by the polystyrene with standard molecular weight

SYMBOL DESCRIPTION

No

What we claimed is:

1. A dicyclopentadiene phenol and 2,6-dimethyl phenol copolymer epoxy resin having the following Formula I:

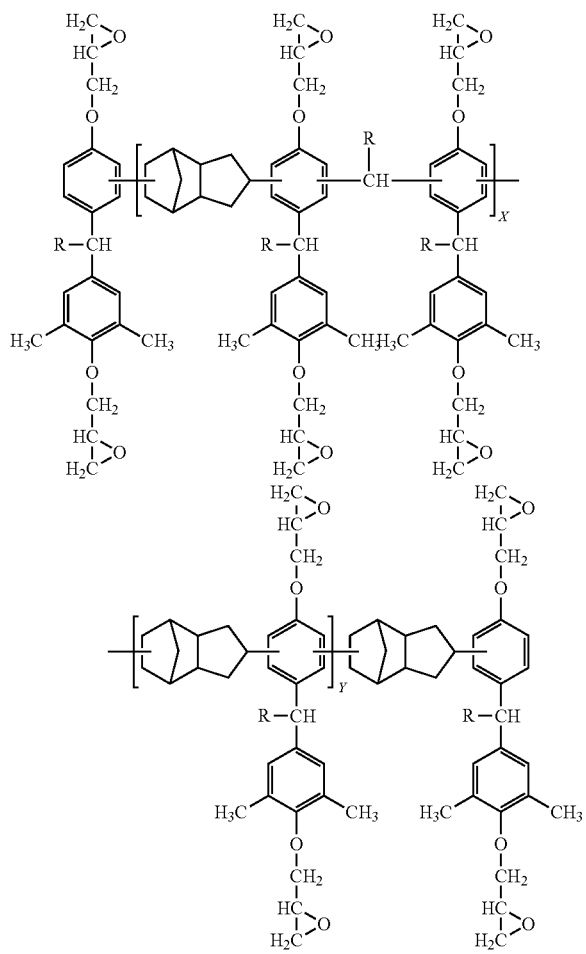

Formula I wherein, X is equal to an integer from 1-5, Y is equal to an integer from 1-5, and R represents hydrogen, $C_1$-$C_{10}$ alkyl group, phenyl group, or phenyl hydroxyl group.

* * * * *